Figure 3:
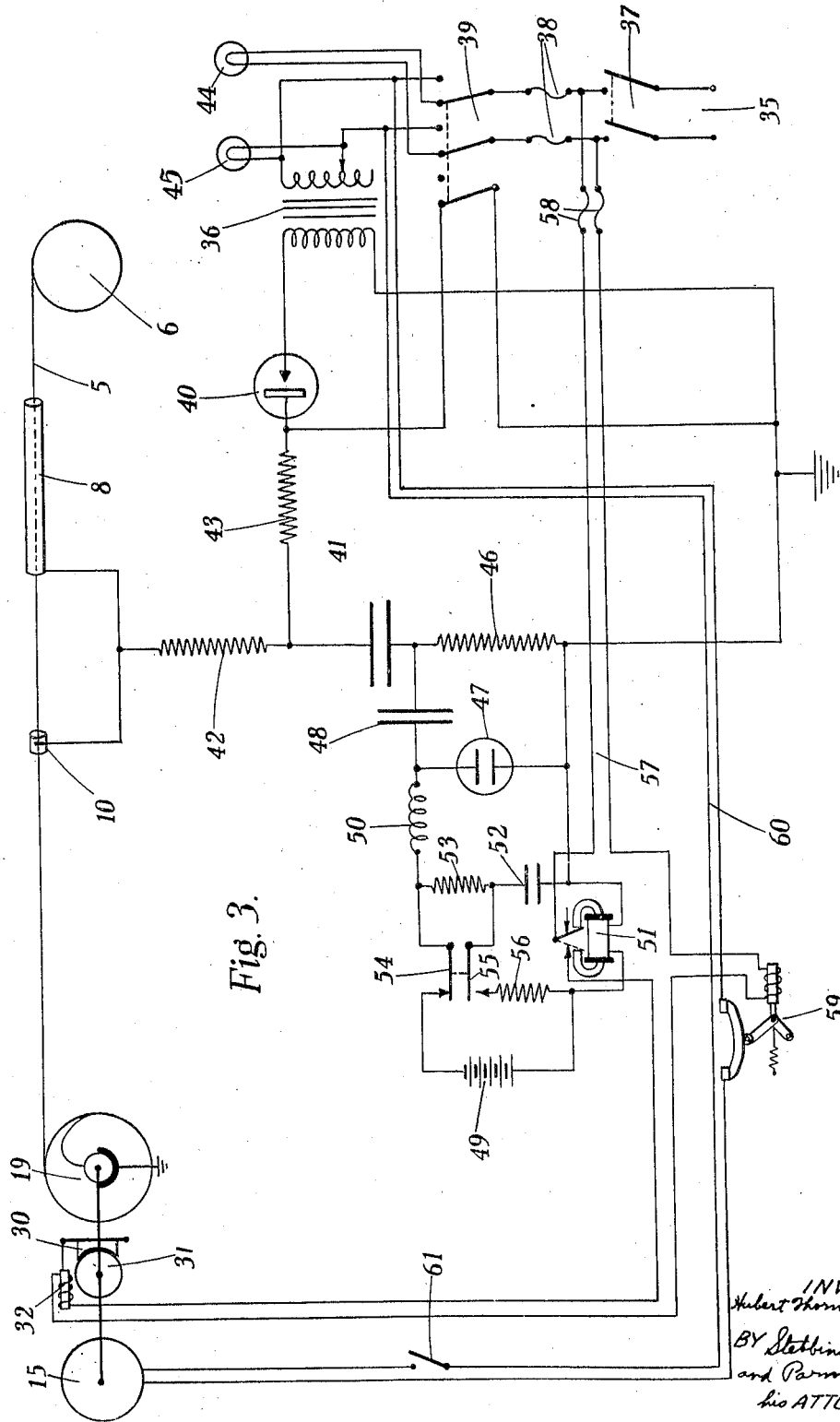

Aug. 2, 1938.   H. T. GOODING   2,125,630
ELECTRIC TRIGGER RELAY AND SIMILAR DEVICE
Filed Feb. 14, 1936   2 Sheets-Sheet 1
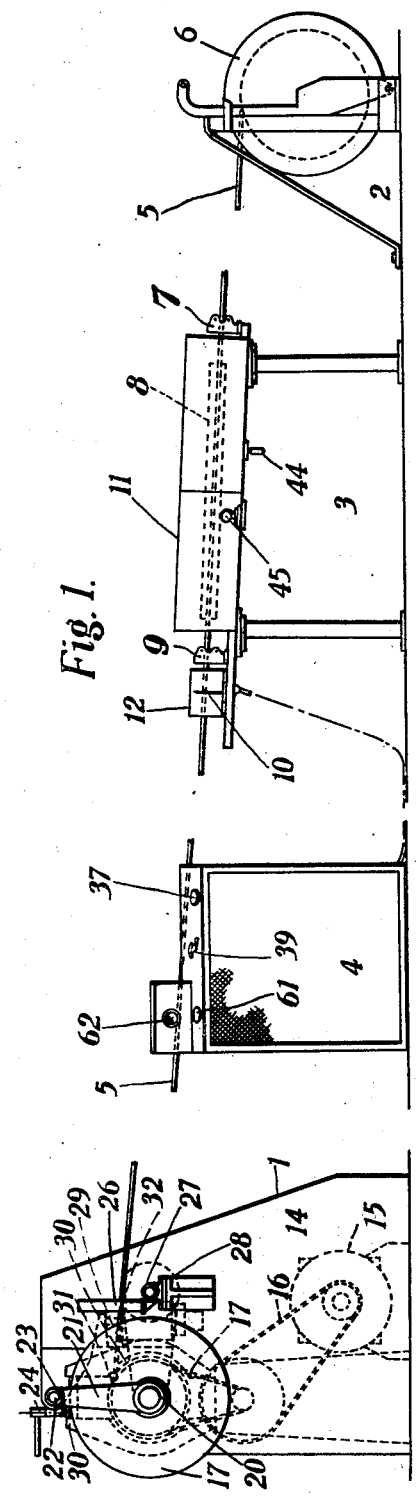
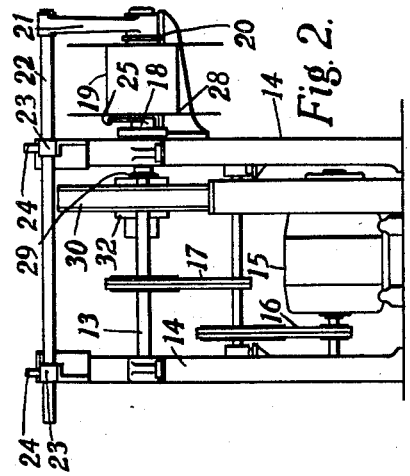
INVENTOR
Hubert Thorn Gooding
BY
Stebbins, Blenheim Parmele
his ATTORNEYS Patented Aug. 2, 1938

2,125,630

UNITED STATES PATENT OFFICE 2,125,630

ELECTRIC TRIGGER RELAY AND SIMILAR DEVICE

Hubert Thorn Gooding, Kent, England, assignor to Callender's Cable and Construction Company Limited, London, England, a British Company Application February 14, 1936, Serial No. 63,976
In Great Britain February 15, 1935

2 Claims. (Cl. 175—320)

This invention relates to apparatus for detecting or producing response to electric current impulses. It provides a device which is responsive to a current impulse of very short duration. An operative circuit is used which comprises a two-electrode neon tube, a high frequency choke coil, a relay or indicating device and a source of D. C. supply by which the tube is normally subjected to a voltage between the critical starting and stopping voltages thereof, the critical starting voltage being defined as the minimum voltage required to start a discharge through the tube and the critical stopping voltage being defined as the maximum voltage below which discharge cannot be maintained. In conjunction with this operative circuit is used a high resistance which is inserted in the circuit through which the impulse flows and connected across the tube. The current impulse flows through this resistance and produces a non-oscillatory voltage impulse at the neon tube. This voltage impulse is sufficient to trigger the tube by raising the value of the voltage to which it is subjected at least to its critical starting voltage, and thereby start a flow of current through the operative circuit. This current continues after the initiating action has ceased and actuated the relay or other indicating device and may when desired be terminated after an interval of time by a switching operation.

By using a condenser or transformer connection between the operative circuit and the current impulse circuit, the operative circuit can be used in conjunction with an impulse circuit normally working with a high continuous current voltage, since any steady voltage or continuous current condition does not affect the operative circuit.

The invention can be used in connection with apparatus for detecting faults in electric insulation such, for instance, as the insulation of an electric cable which is carried continuously past high voltage testing electrodes. To enable the invention to be more fully understood reference will be made to the accompanying drawings which diagrammatically show an example of high voltage, insulation testing apparatus which embodies the invention. In the drawings Figure 1 is an elevation of the testing apparatus, Figure 2 is an end elevation of the winding head shown in Figure 1, and Figure 3 is a diagram of the electrical circuit employed in the apparatus.

The testing apparatus will be described, firstly with reference mainly to Figures 1 and 2 which show the general mechanical layout of the machine and, secondly, with reference to Figure 3. The apparatus, which is designed to test the insulation of electric cables, comprises a number of associated units. These are a winding head 1, a back stand 2, an electrode stand 3 and a unit 4 comprising a high tension cabinet and control panel. By means of the winding head 1, the cable 5, of which the insulation is to be tested, is drawn off from its reel 6 rotatably mounted in the back stand 2 and drawn successively through guide rolls 7, a main high voltage electrode 8, guide rolls 9, and an auxiliary search electrode 10. Both main and auxiliary electrodes are enclosed in electrode chambers 11 and 12, respectively.

The winding head comprises a main driving shaft 13 supported in the frame 14 of the head. This shaft is arranged to be driven by an electric motor 15 through a double reduction rope drive shown at 16 and 17. On the overhanging end of the shaft 13 is mounted one, 18, of the two members supporting the take-up reel 19. The other support 20 for the reel is carried by an arm 21 mounted on the overhanging end of the shaft 22. The latter is supported in split bearings 23 so that it may readily be moved axially after slacking off the clamping bolts 24 to permit of replacement of the reel. The reel is positively rotated by its engagement with a crank pin 25 on the support 18. The cable is led to the reel between the vertical roll guides 26 of a transversing gear 27 mounted on a bracket 28 and driven by the shaft 13 through the chain drive 29. Associated with the shaft 13 is a solenoid operated brake which comprises a pair of brake shoes 30 which are pressed into engagement with a brake drum 31 when the solenoid 32 is energized. This action takes place and current is simultaneously cut off from the motor when a fault in the cable insulation passes the electrode 8.

The electrical apparatus is mounted in the high tension cabinet of the unit 4. Power is taken from a source of A. C. supply 35, for instance, a 230 volts, 50 cycle supply, to feed the primary of the high tension testing transformer 36, a double pole main switch 37, fuses 38 and a control switch 39 being inserted between the source and the transformer. The primary of the transformer has one or more tappings so that the voltage across the secondary can be varied when it is desired to obtain various values of testing voltage to suit different thicknesses and qualities of insulating material. One end of the secondary winding of the transformer is connected to earth and the other is connected to a rectifier 40, the direct current side of which is connected to a high tension condenser 41 and to the high tension electrodes 8 and 10 in parallel. A current limiting resistance 42 is inserted between the condenser and the electrodes 8 and 10 connected in parallel, and a second resistance 43 is inserted between the condenser and the rectifier. The other side of the condenser is earthed. The control switch 39 is a triple pole change over switch.

In the "off" position of this switch the supply is disconnected from the transformer and is connected to a pilot lamp 44, and the testing electrode is connected to earth. The lamp 44 may be of a distinctive colour, say green, and when illuminated it indicates that it is safe to insert a cable in the electrode. In the "on" position the connection of the electrode to earth is removed and the supply is connected to the transformer, this being indicated by the lighting of a pilot lamp 45, which may be coloured red.

Normally, when switch 37 is closed and the control switch is in the "on" position the condenser 41 is charged to the D. C. potential of the rectifier. When a fault in the insulation of the cable 5 enters the test electrode 8 the discharge circuit of the condenser is completed through the fault and the cable conductor of which the leading end is earthed through the frame of the winding head. Such a discharge is detected by means of one form of our improved device for detecting current impulses which is connected to the discharge circuit in the following manner: A large resistance 46 is inserted in the discharge circuit, between the condenser 41 and earth. To the ends of this resistance are connected the terminals of a neon tube 47, a condenser 48 being inserted between the one terminal of the tube and the resistance 46 to isolate the tube from the test voltage. A battery 49 or other source of steady potential of the appropriate value previously indicated is also connected to the terminals of the neon tube 47, a high frequency choke coil 50 being inserted between one of the tube terminals and the source 49 so that impulses of current flowing through the resistance 46 cannot be by-passed through the source 49. Accordingly the fault current flowing through test circuit sets up a pressure difference across the resistance 46 which raises the voltage applied to the terminals of the tube to or above the starting voltage and causes a discharge current to flow through the operative circuit comprising the battery and the tube. In this circuit is an indicating device which responds to the flow of current in the circuit when the discharge has been started. Preferably, this indicator is a relay. In the operative circuit shown in Figure 3, the relay 51 is of the polarized type which is moved in one direction by the discharge current flowing in the circuit and in the other by a reverse current. A condenser of relatively large capacity may be used to supply the re-setting current. In the circuit shown in Figure 3 a condenser 52 is used for re-setting the relay. This condenser is connected directly in series with a high resistance 53 and the condenser and the resistance are placed across the terminals of the source of supply 49 in parallel with the tube 47, the choke 50 being between the resistance 53 and the one terminal of the tube and the relay 51 being between the condenser and the source 49. When the discharge through the tube commences, the current is supplied mainly from the source 49, the condenser 52 contributing very little owing to the high resistance 53 in series with it. The relay 51 is then actuated and remains in the actuated position until the circuit between the source 49 and the tube is interrupted by opening the key switch 54 which action simultaneously closes the key switch 55 mechanically coupled thereto and connects the condenser 52 across the terminals of the relay preferably through a comparatively small resistance 56. The resulting discharge from the condenser 52 re-sets the relay. The key switches 54, 55 are then released and the condenser is re-charged, the operative circuit being then in a condition to detect the next current impulse in the test circuit.

Normally, that is when the tube 47 is not discharging, the switch of relay 51 is open. When a flow of current is started in the operative circuit due to a fault in the cable insulation the switch of the relay is closed and the relay circuit 57, which may conveniently be connected through fuses 58 and switch 37 to the source of supply 35, is completed. This causes the brake solenoid 32 and the coil of the circuit breaker 59 in the motor circuit 60 to become energized, thereby cutting off the supply to the motor 15 and applying the brake 30. It is preferred to take the supply for the motor from the "dead" side of the control switch 39 so that cable cannot be run through the machine without being tested. A switch 61 is included in the motor circuit so that power may be cut off from the motor whilst the fault is being localized by the aid of the auxiliary search electrode 10 which is movable by hand along the stationary cable. It will be appreciated that the glowing of the tube 47, which may be observed through a window 62 in the control panel, will provide a visible indication of the detection of a fault.

What I claim as my invention is:—

1. Apparatus responsive to an electric current impulse of short duration flowing in a circuit, comprising a high resistance inserted in said circuit, an operative circuit, a two-electrode neon tube forming part of said operative circuit, means for subjecting said tube to a direct current voltage between the critical starting and stopping voltages thereof, means associating said neon tube with said high resistance whereby a non-oscillatory voltage impulse set up across said resistance by a current impulse exerts a trigger action on said tube and starts a flow of current in said operative circuit, a polarized relay inserted in said operative circuit and actuated in one direction by the flow in the said operative circuit, a switch for opening said operative circuit, and means for supplying to said relay a second flow of current whereby the relay is actuated in the opposite direction.

2. Apparatus responsive to an electric current impulse of short duration flowing in a circuit, comprising a high resistance inserted in said circuit, an operative circuit, a two-electrode neon tube forming part of said operative circuit, means for subjecting said tube to a direct current voltage between the critical starting and stopping voltages thereof, means associating said neon tube with said high resistance whereby a voltage impulse set up across said resistance by a current impulse exerts a trigger action on said tube and starts a flow of current in said operative circuit, a polarized relay inserted in said operative circuit and actuated in one direction by the flow of current therein, a condenser and a second high resistance in series, connected in said operative circuit in parallel with said tube, and means for opening the said operative circuit and for connecting said condenser across said relay, whereby the discharge current from the condenser flows through the relay in the re-setting direction and re-sets it.

HUBERT THORN GOODING.